July 19, 1960

J. C. FLANAGAN 2,945,306

TAPPING APTITUDE TESTING METHODS AND DEVICES

Filed March 10, 1959

INVENTOR

John C. Flanagan

BY Stevens, Davis, Miller & Mosher

ATTORNEYS

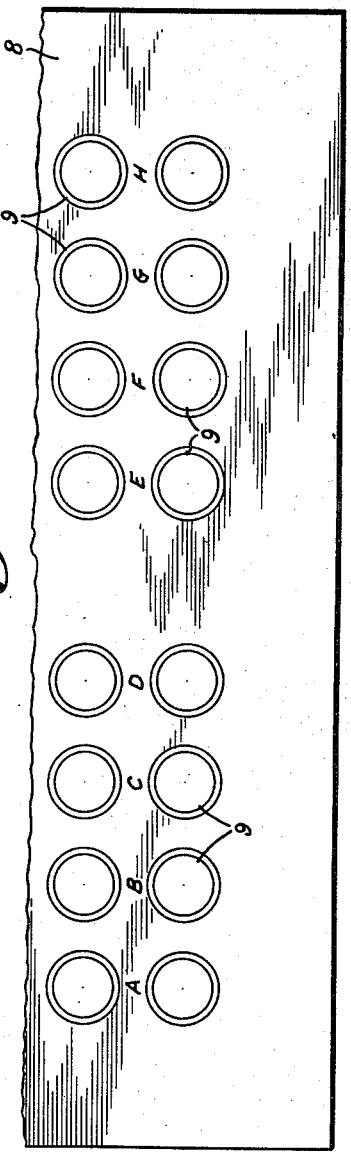
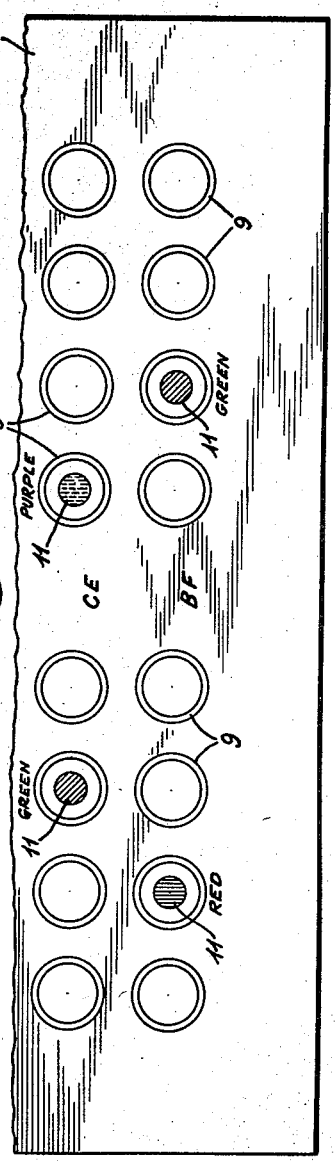

& emsp; 2,945,306
Patented July 19, 1960

2,945,306
TAPPING APTITUDE TESTING METHODS AND DEVICES

John Clemans Flanagan, 410 Amberson Ave., Pittsburgh 32, Pa.

Filed Mar. 10, 1959, Ser. No. 798,452

3 Claims. (Cl. 35—22)

This invention relates to apparatus and methods for testing the aptitude of a person for tapping with the fingers in a pre-designed pattern and sequence. More particularly, the invention resides in a novel means and method for determining the speed at which a person is able to type or manipulate the fingers in a typing-like operation and also for determining the person's ability to type or tap accurately in a given sequence and pattern of letters at a given speed. There exist many skills which require a high degree of dexterity in manipulating the fingers. Among such skills might be mentioned typewriting, teletypewriting, playing certain musical instruments, such as the piano, trumpet and others to name but a few.

Numerous devices have been contrived for determining or testing the aptitude of a person in these finger-manipulating skills. Such devices range from very simple charts portraying, in a single plane, the points of contact usually encountered by the finger tips in the execution of the skill, to rather elaborate three-dimensional dummies or models of the actual device upon which the fingers operate in performing the skill.

Where such aptitude-testing devices are utilized, a primary measure of their value is the extent to which they actually and accurately determine the ability of the person being tested to use the real finger-manipulated machine or musical instrument, etc.

A further consideration in determining their adequacy is the ease with which the instructor may evaluate the results of the test. A long and complicated procedure required to derive significant values from such a test will detract greatly from the utility of any such device.

It is also essential that any such device be as economical as possible and related to this factor, perhaps, is the desirability of having a testing device which is portable, relatively compact in form, and easily understood and utilized by the person being tested.

Aptitude-testing devices of the type described may, and often do, have a second function equally significant to their function as a testing device. This second function is that of teaching the particular finger-manipulating skill. The two functions of testing and teaching by means of such devices are usually related in that the teaching feature is in reality a self-testing technique whereby the student is enabled through the use of such a device to see readily his errors and concentrate his efforts in repeated practice toward the correction of those errors.

Here again such teaching devices serve their purpose in proportion to the ease with which they are utilized by the student and to the extent to which they expedite the learning process.

The present invention relates to such dual-purpose devices of the type described which may be used for testing the aptitude of a person to perform certain skills requiring manipulation of the fingers and which may be used also as a training device in training a person to perform these skills.

This invention further resides in the novel method which I have contrived for testing the finger manipulating aptitude of a person.

More specifically, my novel tapping aptitude testing device is comprised of simple components which are very inexpensive and quite easily used. There is first a series of small cylindrically shaped absorbent pads, the number of which corresponds generally to the number of fingers of the person which are used in performing the skill. These pads are attached to the finger tips of the person by any suitable means and are then saturated with ink or other colored liquid. A different colored liquid is used for each pad.

When the pads have been inked and attached to the fingers, the tested person is given a sheet of paper bearing indicia which represent the points of contact of the fingers of a person in actually performing the particular skill for which he is being tested. Thus, if typing aptitude is being tested, the sheet of paper will bear indicia depicting the keys of the typewriter; for piano playing the keyboard of a piano, etc.

Then in accordance with either oral instructions or instructions printed on the sheet of paper, the tested person will attempt to manipulate his fingers so as to tap the sheet of paper in a given sequence and pattern. Since the indicia on the sheet of paper mark out certain areas in which taps by certain fingers should correctly occur, it is possible to correlate the color marking caused by contact of a given finger with a given indicia in such a way as to determine whether the person has followed the correct tapping sequence and tapped in the correct pattern. From this determination a fairly accurate conclusion can be drawn as to aptitude of the person for performing the particular finger manipulating operation for which he is being tested.

It will also be appreciated that the correlation between certain fingers and certain colors will enable one to identify the nature of an erroneous tap, that is, which finger was incorrectly manipulated, and thereby to facilitate, by continued practice, the elimination of the recurrence of the same error. Thus, my device is very useful as an apparatus for training persons in certain skills.

An additional possibility of use is suggested by my device in that it is often desirable on the part of physicians to ascertain the extent of a neuralgic or arthritic condition in, or effecting, the digital members of the body. Such conditions often impair the normal movement of the fingers. By appropriate arrangement of indicia on the sheet of paper and appropriate instructions as to the pattern and sequence of tapping to be followed, useful information as to extent and nature of such condition could be obtained.

It is accordingly a major object of this invention to provide a device which may be utilized to ascertain the aptitude of a person to perform operations which require manipulation of the fingers.

It is a further object of my invention to provide a training device which may be used in developing the skill and ability of a person in performing operations which require a high degree of dexterity in using the fingers.

It is an additional object of my invention to provide a device which may be used as either a finger tapping aptitude testing device or as a device for training in finger manipulative skills without requiring alterations of parts or substantial departure from mode of use.

A further object of this invention is the provision of a device for ascertaining the aptitude of a person for coordinated finger manipulation by a method which is rapid and requires no special ability on the part of the person administering the test.

A further object of the invention is to provide a testing device which will quickly and accurately indicate the ability of a person to perform finger tapping operations.

A still further object of this invention is to provide apparatus which may be used by physicians in determining the nature and extent of an arthritic or neuralgic condition affecting the coordination of digital members of the body.

It is also an object of the present invention to provide a method of testing aptitude for performing skills which require coordinated manipulation of the fingers.

Other objects and applications of my inventive concept will occur to those skilled in the art and will more fully appear as the following description proceeds.

To the accomplishment of the foregoing and related ends, the invention then comprises the features hereinafter fully described and particularly pointed out in the claims, the following description and the annexed drawings setting forth in detail an illustrative embodiment of the invention, this being indicative, however, of but one of the various ways in which the broad principle of the invention may be employed.

In the annexed drawings:

Figure 3 depicts one of the cylindrical absorbent pads.

Figure 4 is a plan view of a sheet of paper bearing indicia representing keys of a typewriter, which sheet is used in conjunction with the absorbent pads depicted in Figure 1 in the novel process of my invention.

Figure 5 is a view of a second sheet of paper similar to Figure 4 depicting the key indicia after a person has attempted to tap in an instructed sequence and pattern with the fingers.

Figure 1:
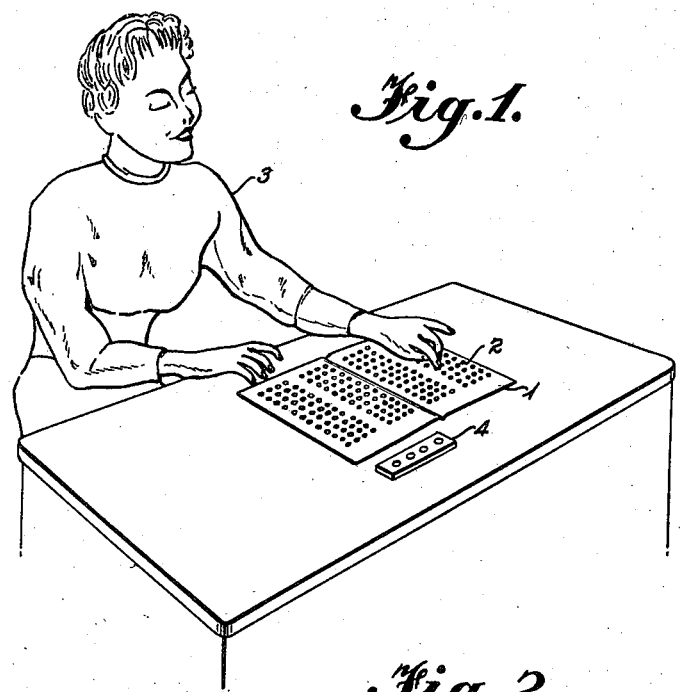
Figure 1 depicts my finger tapping aptitude testing device in use by a person.

Referring now in detail in Figure 1, a booklet 1 or sheet of paper is illustrated upon which is printed or otherwise inscribed indicia 2 which represent and appear similar to the keys of a typewriter. Thus, the indicia are circular in configuration and are arranged in lines as are the keys of an actual typewriter. A person 3 is shown being tested for tapping aptitude in a manner hereinafter to be more fully described. A four-well ink tray is depicted at 4. The wells of this tray each carry a different colored ink, for example, blue, red, green and purple.

Figure 2:
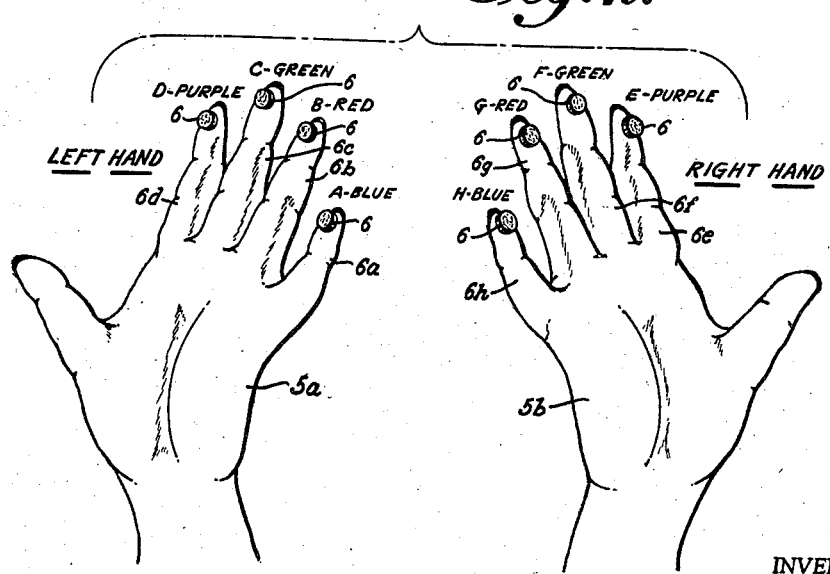
Figure 2 is a perspective view of the cylindrical absorbent pads which are adhered to the fingers.

In Figure 2 are shown the hands 5a and 5b of a person to be tested with the absorbent pads 6 attached to the inner side of the finger tips. The fingers of the left hand 5a, excepting the thumb, are designated 6a, 6b, 6c, and 6d for the little finger, ring finger, middle finger, and index finger, respectively. The fingers of the right hand 5b, excepting the thumb, are designated 6e, 6f, 6g and 6h for the index finger, middle finger, ring finger, and little finger, respectively. As will be perceived from an inspection of Figure 2, the absorbent pads 6 on each hand have been saturated with a different colored ink.

In Figure 3, one of the cylindrical absorbent pads 6 of my invention is depicted. The material of construction of these pads may be any porous, absorbent material which will retain its general shape in use such as felt or styrofoam. A layer of adhesive material 7 is attached to the upper surface of the pads.

Figure 4 is a plan view of a portion of a sheet of paper 8 bearing indicia 9 which represents the keys of a typewriter. These indicia are appropriately labeled with certain letters of the alphabet equivalent to the corresponding key of the typewriter which they are intended to depict. Although any number and combination of keys might be represented by the indicia, I have chosen the keys A, B, C, D, E, F, G and H as indicated in the drawing.

It is to be pointed out that although in Figure 4 a single sheet of paper bearing the indicia has been indicated, this sheet of paper may conveniently be a single page in a testing booklet.

In Figure 5, a portion of a second sheet of paper 10 is illustrated, upon the surface of which the same indicia as those shown in Figure 4 are again reproduced. It is to be noted, however, that in Figure 5, the indicia are not labeled with their appropriate alphabetical letters. Instead certain letters or combinations of letters are printed or inscribed upon the paper at a point centrally located with reference to the key indicia. The function of these letters in the operation of my invention is hereinafter described.

The view of Figure 5 portrays the paper 10 after the person being tested has attempted to tap upon the paper with his fingers in an instructed sequence and pattern. As a result of this tapping the ink-bearing absorbent pads 6 come in contact with the surface of the paper 10 and leave colored dots 11 upon certain areas of the surface which correspond, as indicated by the indicia, to certain typewriter keys.

The method of testing finger tapping aptitude by use of my novel device will now be described in detail.

At the outset, the person to be tested affixes the absorbent pads 6 to the under side of his finger tips. Although a preferred way of doing this is that which is illustrated, i.e., by means of an adhesive layer, any other convenient mode of securing the pads to the finger tips may be employed.

It will be noted that the pads are secured to all the fingers of each hand except the thumb. This arrangement is merely for convenience in testing and it is considered within the scope of this invention to utilize thumb pads if such use is warranted by the type of test contemplated.

After the pads are secured by suitable means to the finger tips, each pad is dipped in an ink of specified color carried in the wells of ink tray 4. The pads are constructed of absorbent material and a considerable quantity of the ink will be absorbed in each pad. In the preferred embodiment of my invention which is illustrated, the pads on the respective fingers are dipped in ink of the following colors: left index finger—purple, left middle finger—green, left ring finger—red, left little finger—blue, right little finger—blue, right ring finger—red, right middle finger—green, right index finger—purple.

Having inked the absorbent pads with ink of appropriate color, the person to be tested is now ready to commence the test. He is first given a sheet of paper bearing indicia similar to the sheet of paper 8 illustrated in Figure 4. As pointed out above, this sheet of paper may be in the form of one of the initial pages in a testing booklet. It is explained to the tested person that in the test the key-representing indicia will each correspond to a given letter of the alphabet which is indicated beneath the appropriate indicium. Thus, in each exercise the first "key" on the left side of each row will correspond to the letter "a," the second to "b," the third to "c," etc. It is further explained to the person being tested that he is to use certain fingers to tap upon the indicia representing certain alphabetical letters. Thus, in the illustrated preferred embodiment of my invention, the person will use the left little finger to tap the first indicium in the line representing the letter "a." The ring finger left hand will be used to tap the indicium representing the letter "b," etc. The correlation of fingers with letters will be easily understood by referring to Figures 2 and 4.

After the person to be tested understands which keys represent which letters of the alphabet, he is given a sheet of paper carrying identical indicia to that which he has just seen, but without the appropriate corresponding alphabetical letters. (See Figure 5.) In a column down the center of the sheet are inscribed various combinations of alphabetical letters. The person is instructed that he is to tap out on the paper, the combinations of letters prescribed in the central column. Thus, in the embodiment shown in Figure 5, the person would be required to tap the letters "c" and "e" by touching the correct finger to the correct key-representing indicium that is, to the "key" which corresponds to the letters "c" and "e." The same operation is repeated in the next line of indicia for the letters "b" and "f," etc. The tested person is given a limited time to complete the series of tapping operations. The complexity of the tapping pattern and sequence may be increased in subsequent exercises. For example, combinations of three or four letters and more than one horizontal row of "keys" might be employed.

When the tapping exercises have been completed, the instructor or proctor is able to quickly and easily ascertain the errors which a person has made and the nature of the errors. Referring again to Figure 5, it will be seen that in following the instructions to tap the letters "c" and "e," the tested person has tapped his left middle finger upon the third key indicium from the left in the first row of "keys." This is indicated by the location of the green dot. He has further tapped his right index finger upon the fifth key indicium from the left and this is indicated by the resulting purple dot at that location. The instructor can thus readily determine that the simple exercise has been performed correctly. If a dot of the wrong color appeared upon the right "key," the instructor would be immediately aware of the fact that the person has used the wrong finger in tapping the letter.

Although I have described a method and apparatus primarily directed toward the testing of typing aptitude, the basic inventive concepts of my invention may be utilized in testing a number of skills requiring manipulation of the fingers. For example, the skill and speed of one already able to use a typewriter might be determined by using key indicia lettered in the identical pattern and sequence to the keys of a typewriter, i.e., a, s, d, f, g, h, j and k instead of a, b, c, d, e, f, g and h as illustrated in the preferred embodiment.

As an alternate to the use of different colored liquids, pads having different shapes such as circles, triangles, squares and ovals, or pads in the shape of letters, numbers, or other symbols may also be used.

It is thus to be understood that the form of the invention herewith shown and described is to be taken as a preferred example of the same and that various changes in the shape, size and arrangement of parts may be resorted to without departing from the spirit of the invention or the scope of the subjoined claims.

What I claim is:

1. A method for testing digital dexterity comprising the steps of temporarily attaching a plurality of absorbent pads to the finger tips of a person to be tested, absorbing a different colored ink in each of said pads, and tapping with the finger tips upon an indicia bearing surface while attempting to conform to the pattern and sequence of said indicia, whereby variation from said pattern and sequence are detectable by color.

2. A method for testing aptitude for digital manipulation comprising attaching individual marking means to each of the fingers whereby each finger may be identified with a specific mark made by one of said individual marking means, tapping the fingers upon an indicia bearing surface in response to an instructed sequence and pattern for tapping, and comparing marks left on said indicia bearing surface with said instructed sequence and pattern for tapping.

3. A method for testing finger manipulative skill comprising attaching individual absorbent pads to each of the finger tips of a person to be tested, absorbing a different colored ink in each of said pads, tapping said pads upon an indicia bearing surface in accordance with an instructed pattern and sequence, and determining from the resulting color dots marked on said surface and from said indicia the finger manipulative skill of the tapping individual.

References Cited in the file of this patent

UNITED STATES PATENTS

| | | |
|---|---|---|
| 1,688,935 | McChesney | Oct. 23, 1928 |
| 2,722,706 | Chopp | Nov. 8, 1955 |
| 2,728,932 | Ramsey | Jan. 3, 1956 |
| 2,763,885 | Lyons | Sept. 25, 1956 |